L. M. PARRETT.
PROPORTIONAL DIVIDING INSTRUMENT.
APPLICATION FILED SEPT. 16, 1912.
1,125,388.
Patented Jan. 19, 1915.
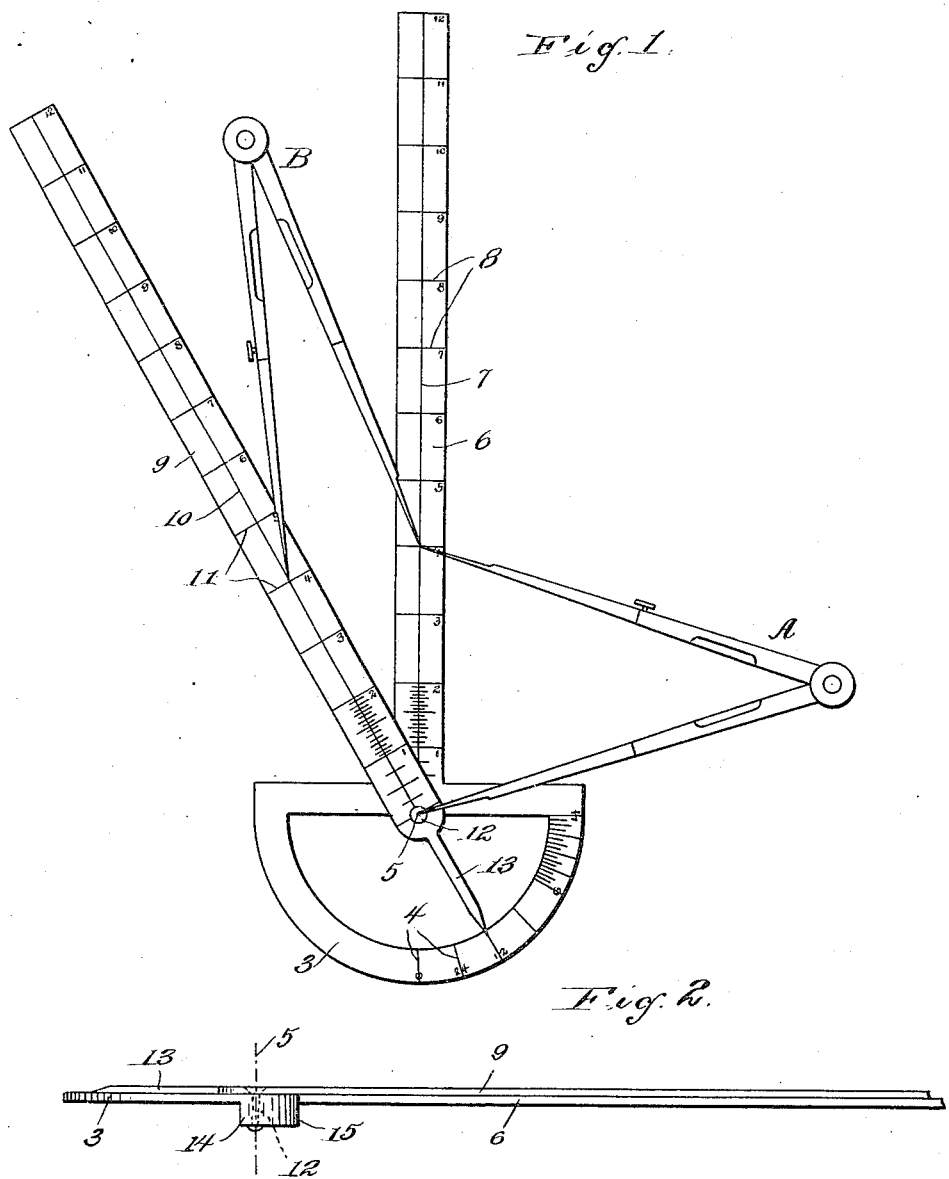
WITNESSES
INVENTOR
Lee M. Parrett,
his Attorney

UNITED STATES PATENT OFFICE.

LEE M. PARRETT, OF BUTTE, MONTANA.

PROPORTIONAL DIVIDING INSTRUMENT.

1,125,388.  Specification of Letters Patent.  Patented Jan. 19, 1915.

Application filed September 16, 1912. Serial No. 720,587.

*To all whom it may concern:*

Be it known that I, LEE M. PARRETT, a citizen of the United States, residing at Butte, in the county of Silver Bow and State of Montana, have invented new and useful Improvements in Proportional Dividing Instruments, of which the following is a specification.

My invention relates to proportional dividing instruments particularly adapted for use in dividing the circumference of a circle in a predetermined number of equal arcs.

The principal object of my invention is to provide means of the character described which is simple in construction, inexpensive to manufacture, accurate in its work, and practical for use in drafting and shop work.

Other objects of my invention will appear in the following detailed description, taken in connection with the accompanying drawings, forming a part of this specification, and in which drawing:

Figure 1 is a plan view of the instrument embodying my invention. Fig. 2 is a side elevation of the same.

Similar characters refer to similar parts throughout the views.

A plate 3 is provided, having a plurality of graduations 4 indicated on its face extending radially to a common axis 5 of the plate. In the example shown, the graduations are subtended between the straight angle, but this may be altered as may be desired, without departing from the spirit of my invention. These graduations are conveniently designated by characters on the blade such as 4—6—12—24 and so forth, so disposed with respect to the graduation designated 0, as to correspond to angles, the legs of which will intersect the circumference of the circle to divide from it an arc equal to 1/4—1/6—1/8—1/12—1/24 and so forth, respectively, of the entire circumference.

Extending from blade 3 is a scale 6 having a line 7 thereon extending longitudinally to said scale and radiating from said axis 5. This scale 6 has transverse graduations 8, spaced apart from each other and from the axis 5, according to the unit of measurement by which the radii of circles are determined.

The second scale 9, complementing scale 6, has a line 10 indicated longitudinally thereon and corresponding to line 7 of scale 6, and transverse graduations 11 corresponding to graduations 8 on the scale 6. The scale 9 is pivoted to blade 3 with line 10 intersecting axis 5, and with graduations 11 spaced apart from each other and from said axis distances equal to the spacing of the graduations on scale 6. The pivoting may be accomplished by means of a screw 12 having a countersunk head and a depression coincident with axis 5.

The scale 9 is provided with an indicator 13 movable over the face of the plate and adapted to coöperate with the graduations 4 to enable a person to determine the magnitude of the angle between lines 7 and 10, to permit of taking measurements from such lines as and for the purpose hereinafter described.

I may find it desirable to provide an abutment 14 below the blade 3 having one face 15 disposed at a right angle to the longitudinal edge of scale 6, whereby the machine may serve as a T-square, said abutment 14 serving as a head, and the scale 6 as a blade. The other scale 9 may serve as a protractor arm for laying off angles, the graduations 4 facilitating this operation.

When bringing the instrument into use for determining an arc or chord of the circumference of a circle, of the predetermined ratio to the entire circumference thereof, a pair of dividers may be used placing the point of one leg in the depression of pin 12 and the point of the other leg on one of the transverse graduations of either scale 6 or 9, as indicated at A, according to the radius of the circle concerned. In the example shown, the circle has a radius corresponding to four units. The circle or arc thereof is then described on the plain surface with the dividers. The operator having previously determined the length of the arc or chord to be struck from the circumference, separates the scales 6 and 9 with indicator 13 pointing to one of the graduations 4, accordingly. In the example shown, the arc is to be struck one twelfth of the entire circumference of the circle. The dividers are then positioned as at B, with the points of the legs thereof at the intersection of the transverse graduations or scales 6 and 9, respectively, with the lines 7 and 10, respectively, thereof. A line connecting the points of intersection determines the chord of an arc which is one-twelfth of the circumference described. If it is desired to divide the entire circumference into twelve equal parts, the same may be accomplished by "stepping off" with the dividers in the usual manner. It is to be noted that practically the ratio of any arc to the circumference of the circle may be determined, regardless of the size of the circle considered, for instance, with the parts disposed as in Fig. 1, one twelfth of the circumferences of the circle having a radius of ten units may be determined by the intersection of the transverse graduations of the scales indicated by 10, with the longitudinally extending lines of such scales.

I claim:—

1. In a proportional dividing instrument, a semi-circular plate having graduations thereupon radiating from its axis, a scale formed integral with said plate and extending at right angles to the straight side of the same, an abutment formed upon the under surface on the straight side of the plate for facilitating the use of the instrument as a T-square, and a second scale pivotally connected to said plate and adapted to coincide with said first named scale when the instrument is used as a T-square.

2. In a proportional dividing instrument, a semi-circular plate having graduations thereupon radiating from its axis, a scale formed integral with said plate and extending at right angles to the straight side of the same, said scale formed upon said plate so that a line extending longitudinally through the center thereof will intersect the axis of said plate, a second scale pivotally connected to said plate at the axis thereof and adapted to coincide with said first named scale, said second scale being provided with a line extending longitudinally of the same and intersecting said axis, and an indicator formed upon one end of said second scale to co-act with the graduations upon said plate.

LEE M. PARRETT.

Witnesses:
NICK SCHAEFER,
RICHARD F. TUCKER.

Copies of this patent may be obtained for five cents each, by addressing the "Commissioner of Patents, Washington, D. C."